United States Patent
Dey et al.

(10) Patent No.: US 9,013,297 B1
(45) Date of Patent: Apr. 21, 2015

(54) CONDITION RESPONSIVE INDICATION ASSEMBLY AND METHOD

(71) Applicants: Saikat Dey, Birmingham, MI (US); Gerrit Reepmeyer, Birmingham, MI (US); Anupam Sengupta, Birmingham, MI (US); Mikhail Zhavoronkov, Birmingham, MI (US)

(72) Inventors: Saikat Dey, Birmingham, MI (US); Gerrit Reepmeyer, Birmingham, MI (US); Anupam Sengupta, Birmingham, MI (US); Mikhail Zhavoronkov, Birmingham, MI (US)

(73) Assignee: Ockham Razor Ventures, LLC, Birmingham, MI (US)

( * ) Notice: Subject to any disclaimer, the term of this patent is extended or adjusted under 35 U.S.C. 154(b) by 0 days.

(21) Appl. No.: 14/517,385

(22) Filed: Oct. 17, 2014

(51) Int. Cl.
  *G08B 1/08* (2006.01)
  *G08B 21/02* (2006.01)
  *G08C 17/02* (2006.01)
  *A42B 3/30* (2006.01)

(52) U.S. Cl.
  CPC ............. *G08B 21/02* (2013.01); *G08C 17/02* (2013.01); *A42B 3/30* (2013.01)

(58) Field of Classification Search
  None
  See application file for complete search history.

(56) References Cited

U.S. PATENT DOCUMENTS

| | | | |
|---|---|---|---|
| 4,665,385 A | 5/1987 | Henderson | |
| 6,992,580 B2 | 1/2006 | Kotzin et al. | |
| 7,188,767 B2 | 3/2007 | Penuela et al. | |
| 7,248,172 B2 | 7/2007 | Clifford et al. | |
| 7,280,040 B2 | 10/2007 | DeVaul | |
| 7,298,258 B1 | 11/2007 | Hudgens et al. | |
| 7,397,368 B2 | 7/2008 | Otto et al. | |
| 7,737,850 B2 | 6/2010 | Malik | |
| 7,830,249 B2 | 11/2010 | Dorneich et al. | |
| 8,040,292 B2 | 10/2011 | Ronzani et al. | |
| 8,294,580 B2 | 10/2012 | Witwer et al. | |
| 8,446,273 B2 | 5/2013 | Humphrey et al. | |
| 2005/0001728 A1* | 1/2005 | Appelt et al. | 340/573.1 |
| 2008/0088434 A1* | 4/2008 | Frieder et al. | 340/539.11 |
| 2011/0115623 A1 | 5/2011 | Gnanasekaran et al. | |
| 2014/0240120 A1* | 8/2014 | Mao et al. | 340/539.11 |

* cited by examiner

*Primary Examiner* — Travis Hunnings
(74) *Attorney, Agent, or Firm* — Reising Ethington PC

(57) ABSTRACT

A portable communications device transportable to remote locations by an individual includes a control unit. A biometric sensor is electrically connected to the control unit. The biometric sensor senses a condition of the individual and creates and transmits a signal to the control unit. An environmental sensor is electrically connected to the control unit. The environmental sensor senses an environmental condition local to the individual and creates and transmits a signal to the control unit. A communications unit is electrically connected to the control unit. It receives the signals from the control unit and transmits them away from the remote locations.

13 Claims, 6 Drawing Sheets

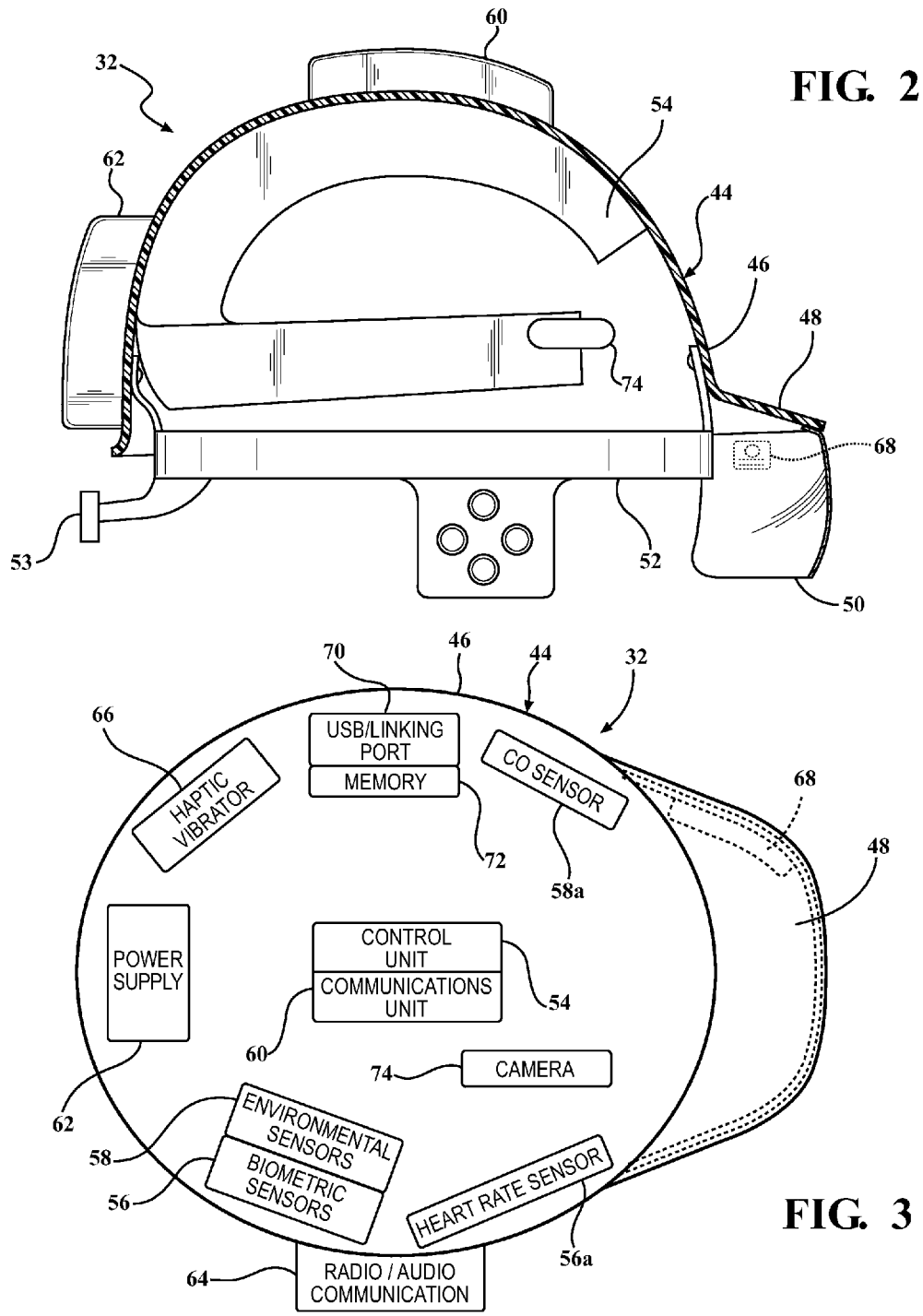

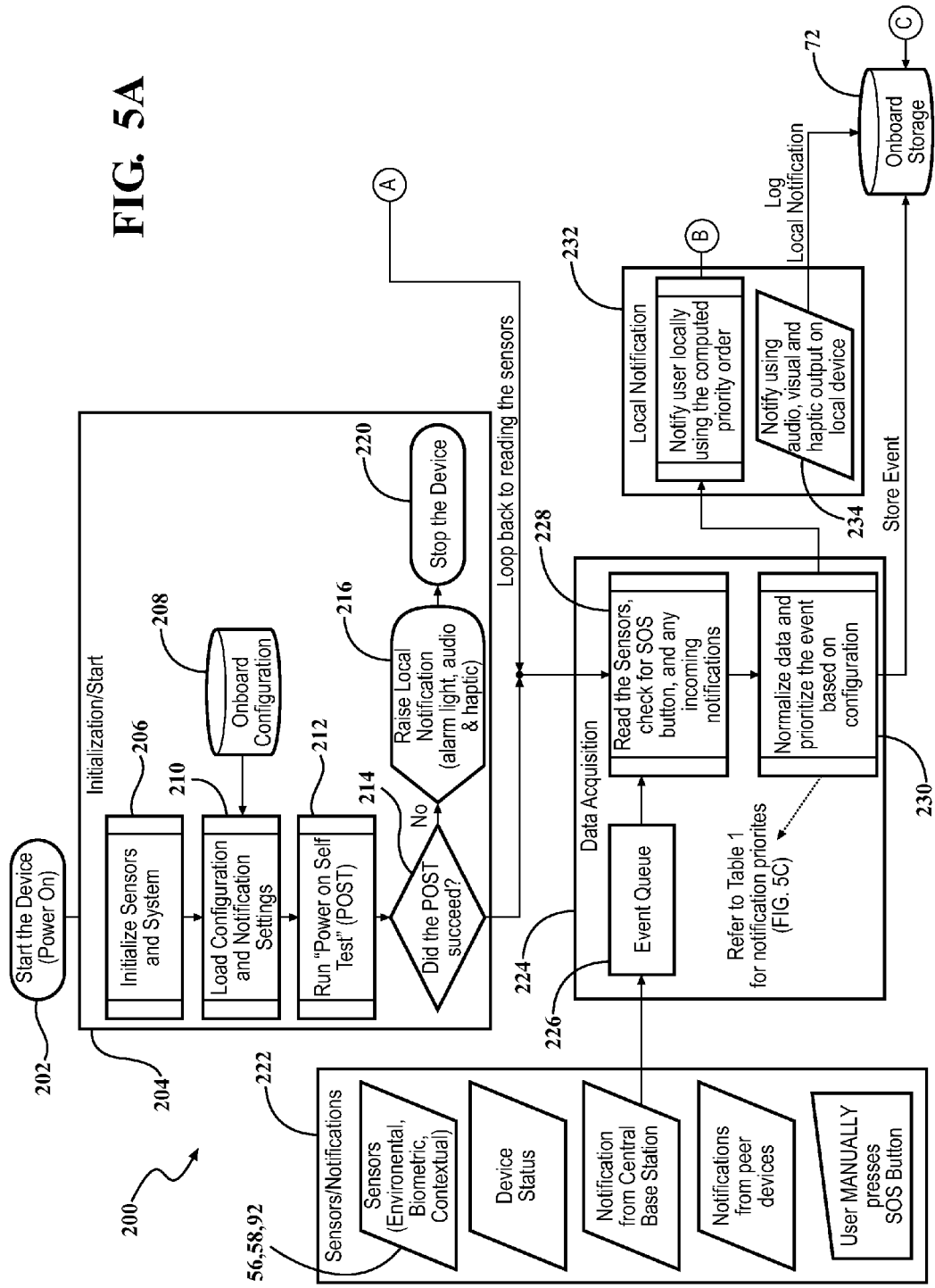

Table 1: Notification Priorities

| Notification Priority (low is higher) | Description | Initiated By |
|---|---|---|
| 1 | SOS Button Press | Manually by User |
| 2 | Life Threatening Conditions (CO, Impact, fall, extreme high temperature, low or missing heart rate) | Locally by the Device |
| 3 | Hazardous conditions ((below threshold of life threatening conditions), and such notifications recieved from base station or peers), or device malfunction | Locally by the Device, or remote notifications |
| 4 | Informational notifications (power on, power off, device not worn while being powered, information notifications from base station) | Locally by the Device, or remote notifications |

FIG. 5C

CONDITION RESPONSIVE INDICATION ASSEMBLY AND METHOD

BACKGROUND OF THE INVENTION

1. Field of the Invention

The invention relates to condition responsive indicating systems. More particularly, the invention relates to condition responsive indicating systems that include personal portable devices, to be worn or carried by individuals.

2. Description of the Related Art

The current landscape for monitoring and analyzing data to improve health and safety outcomes shows significant potential for improvement. For example, industrial safety has traditionally focused on three things: (i) providing equipment for physical protection of the worker (e.g., hardhat, shoes, gloves, eye and hearing protection); (ii) training the worker to avoid possible safety incidents (e.g., seminars, certifications, on the job training); and (iii) auditing safety behavior and taking corrective actions. Depending on the underlying industry, some form of interaction/communication between the worker and his/her environment is typically added to the safety equipment (e.g., radio, carbon monoxide monitor).

On average, an entity may expend thousands of dollars per person per year on discrete health and safety equipment and training, which varies depending on industry specific requirements. More recently, industrial safety applications are increasingly using IT systems to improve safety processes as well as tracking safety compliance. Those solutions are either hardware solutions (e.g., PDAs, asset tracking) or software solutions (e.g., certification and compliance tracking, safety management dashboards).

All of the current industrial safety solutions, however, are facing one major issue: once the worker has received his/her equipment and training, the responsibility to comply with the safety standards remains with the worker, depending on many cases on his/her experience and personal foresight on how to behave and react in a certain situation.

SUMMARY OF THE INVENTION

A portable communications assembly is taken by an individual to remote locations. The portable communications assembly includes a control unit. A biometric sensor is electrically connected to the control unit. The biometric sensor senses a condition of the individual and creates a biometric signal, which is transmitted to the control unit. An environmental sensor is electrically connected to the control unit. The environmental sensor senses an environmental condition local to the individual and creates an environmental signal, which is transmitted to the control unit. A communications unit is electrically connected to the control unit. The communications unit receives the biometric and environmental signals from the control unit and transmits the biometric and environmental signals away from the remote locations.

BRIEF DESCRIPTION OF THE DRAWINGS

Advantages of the invention will be readily appreciated as the same becomes better understood by reference to the following detailed description when considered in connection with the accompanying drawings, wherein:

FIG. 2 is a side view in partial cross section of one embodiment of a wearable device incorporating the invention;

FIG. 3 is a top view of the wearable device shown in FIG. 2;

FIGS. 5A through 5C illustrate a flow chart of the inventive method relating to the presence of hazardous conditions.

DETAILED DESCRIPTION OF THE INVENTION

Figure 1:
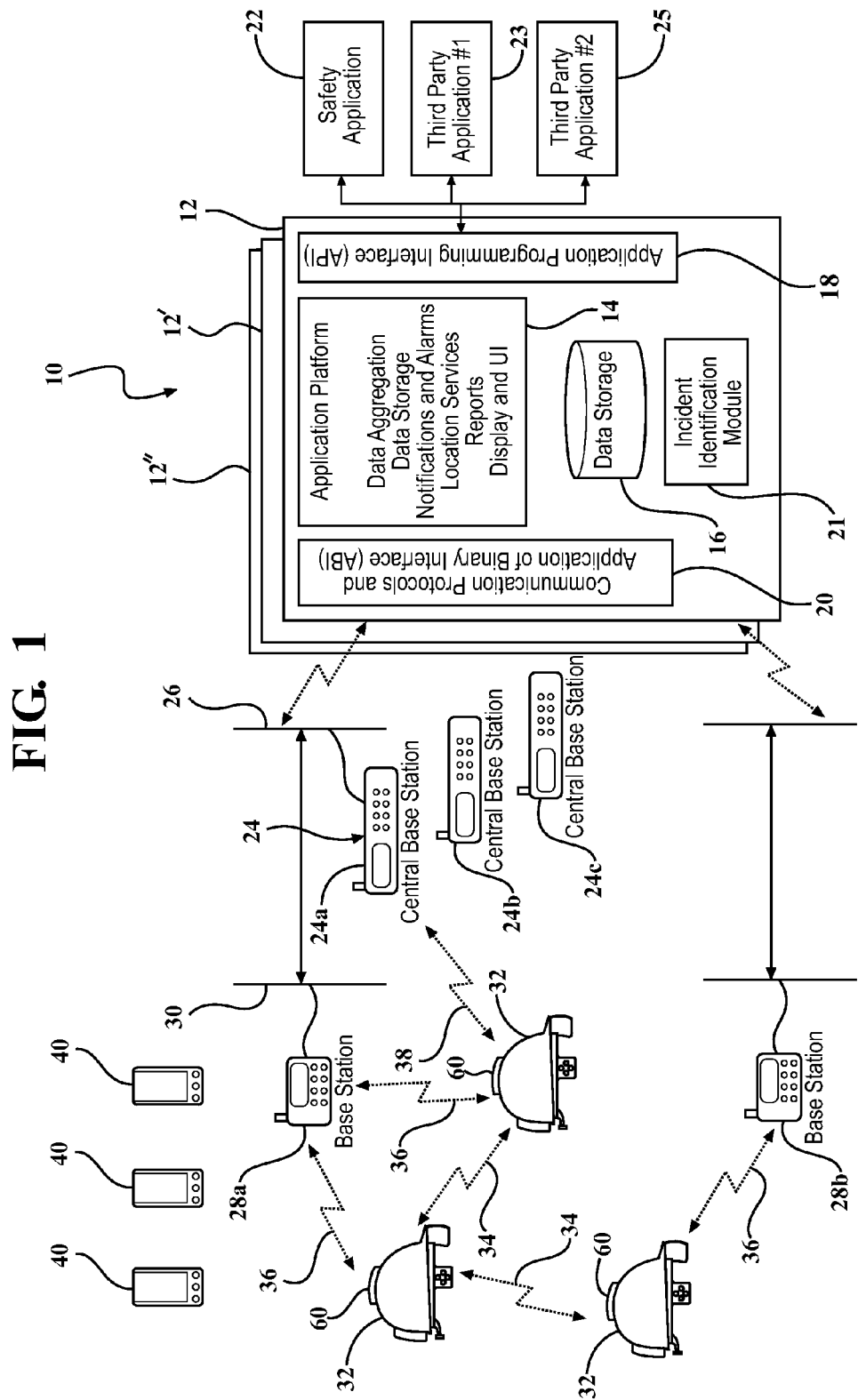
FIG. 1 is a schematic environmental view of one embodiment of the inventive assembly.

Referring to FIG. 1, a communications assembly is generally indicated at 10. The communications assembly 10 facilitates communication between a central processing unit 12 and a plurality of portable communications assemblies, which will be discussed in greater detail subsequently. The central processing unit 12 collects all data and communication and passes it to an applications platform 14. The applications platform 14 may include such functions as data aggregation, data storage, notifications, alarms, location services, an analytics engine, report generator, display and user interface. The central processing unit 12 also includes a data storage facility 16, an application programming interface (API) 18, an application binary interface (ABI) 20, and an incident identification module 21 (discussed in greater detail subsequently).

Multiple copies of the central processing unit 12 are shown at 12' and 12". These multiple copies 12', 12" of the central processing unit 12 may either work cooperatively to increase functionality or independently to provide for system redundancy.

The API 18 provides for an extension of the central processing unit 12 for the development and augmentation to the central processing unit 12 of additional software applications. By way of example and as is shown in FIG. 1, a safety application 22 is connected to the central processing unit 12 through the API 18. Two additional third party applications 23, 25 are also shown as exemplary modules that provide additional function as deemed necessary by the specific deployment of the communications assembly 10.

The communications assembly 10 also includes a communications hub, generally shown at 24 in FIG. 1. The communications hub 24 is operatively connected to the central processing unit 12 and receives communications through a communications bus 26. The communications bus 26 may be local to the communications hub 24 or it may be local to the central processing unit 12 as it is contemplated that communication between the communications hub 24 of the central processing unit 12 may be through an electrical network or wirelessly through any wireless protocol deemed appropriate for the communication between the communications hub 24 and the central processing unit 12. The communications hub 24 may include a plurality of central base stations 24a, 24b, 24c. These central base stations 24a, 24b, 24c may act independently of each other and may be located remote from each other depending on the deployment of the communications assembly 10 in the particular environment in which it is deployed.

The central base stations 24a, 24b, 24c communicate with remote base stations 28a, 28b. The remote base stations may be further distributed throughout a particular environment in which the communications assembly 10 is deployed. The remote base stations 28a, 28b collect data and generate notifications and/or alarms that will be passed on to the communications hub 24 and eventually the central processing unit 12, either directly or via the peer-to-peer mesh network. The remote base stations 28a, 28b serve as back up connections, given that these remote base stations 28a, 28b could also be bypassed by having remote transceivers connected directly to the central base stations 24a, 24b, 24c, as will be discussed in greater detail subsequently. A remote communications bus 30 may extend between the remote base stations 28a, 28b and the central base stations 24a, 24b, 24c.

The communications assembly 10 also includes a plurality of portable communications assemblies 32 that are operatively connected to the central processing unit 12 vis-à-vis the communications hub 24. Each of the plurality of portable communications assemblies 32 transmit remote communications to the central processing unit 12 through the communications hub 24 and receive central communications transmitted by the central processing unit 12, which are also transmitted through the communications hub 24. As can be seen by bidirectional arrows 34, the portable communications assemblies 32 may communicate with each other in a peer-to-peer mesh network. Bidirectional arrows 36 show that the portable communications assemblies 32 may also communicate bidirectionally with the remote base stations 28a, 28b. And finally, a bidirectional arrow 38 graphically illustrates the portable communications assemblies 32 being able to communicate directly with a central base station 24a of the communications hub 24. The portable communications assemblies 32 are designed to facilitate communication in a manner which optimally transfers data that will allow for the most efficient data transfer and action, if necessary, based on the data being delivered. The portable communications assemblies 32 also include a plurality of sensors that will sense conditions. The sensed conditions will be communicated away from the portable communications assemblies 32 to other portable communications assemblies 32 or to the central processing unit 12, the central base stations 24 or the base stations 28.

The incident identification module 21 receives the remote communications from the plurality of portable communications assemblies 32 and identifies a portion of the remote communications from a portion of the plurality of portable communications assemblies 32 as indicating a situation requiring a communication to be sent to the portion of the plurality of portable communications assemblies. In one embodiment, the incident identification module 21 identifies when a situation arises that, based on the readings received in the remote communications, may affect the individuals wearing the portion of the plurality of portable communications assemblies 32 that are producing those remote communications. By way of example, if a portion (one or more) of the plurality of portable communications assemblies 32 measure high carbon monoxide levels, the incident identification module 21 will issue a warning that the central processing unit 12 transmit back to the portion of plurality of portable communications assemblies 32 that either measured the high carbon monoxide levels or are in close proximity of those so those individuals know to immediately leave the area.

The communications assembly 10 also includes a plurality of charging stations 40. The charging stations 40 may be dispersed throughout disparate locations within the environment in which the communications assembly 10 is being deployed, or may even be worn by individuals carrying one of the plurality of portable communications assemblies 32. The charging stations 40 will either charge an energy storage device, such as a battery, built within the portable communications assemblies 32 or will be able to charge an energy storage device that is removable from the portable communications assemblies 32. Design parameters will dictate how the energy storage device will be connected to the portable communications assemblies 32, which may include battery size, the parameters within which the portable communications assembly 32 operates, and/or the environment in which the portable communications assemblies 32 are being deployed.

Figure 4:
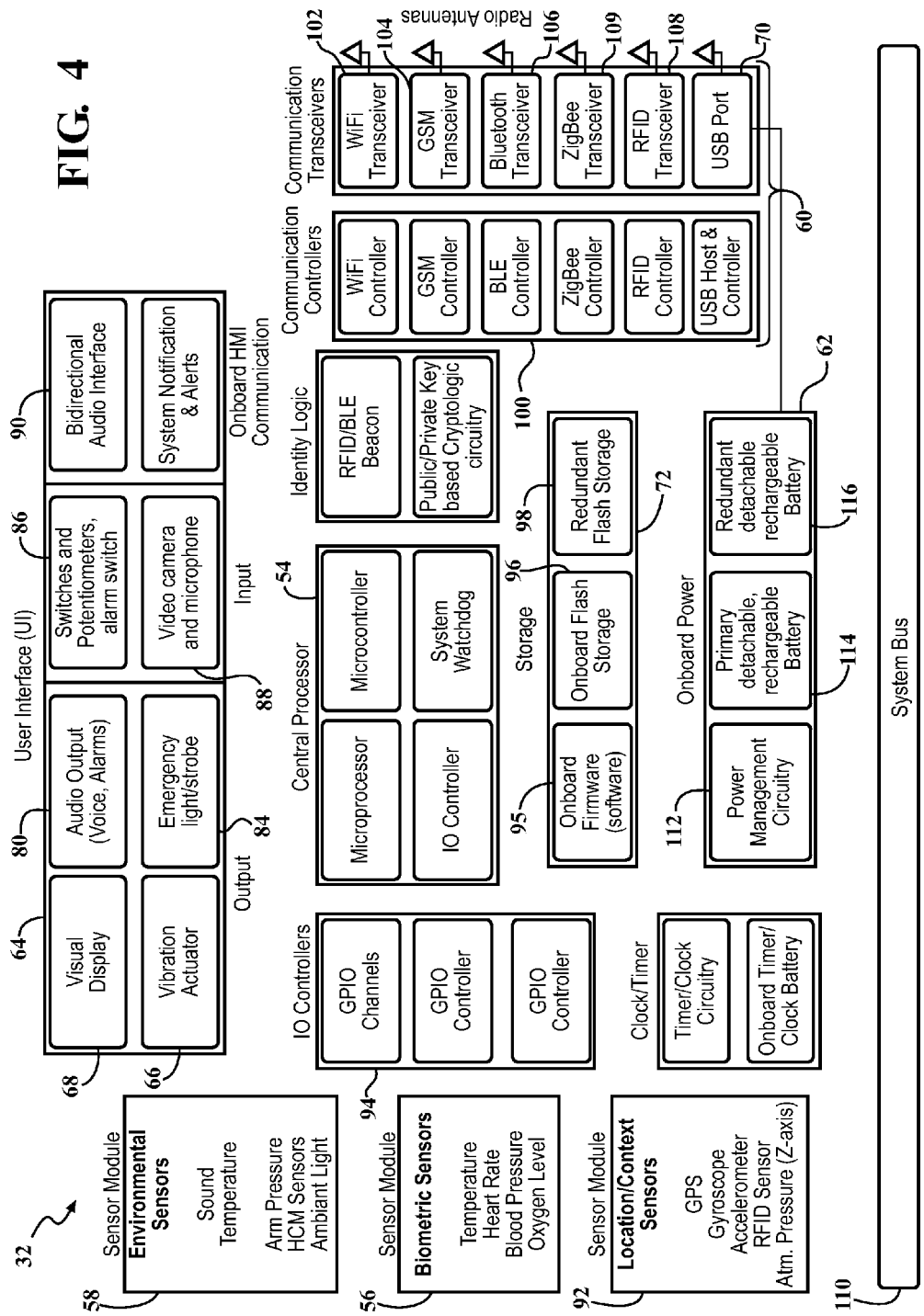
FIG. 4 is a block diagram of the hardware incorporated into the wearable device.

Referring to FIGS. 2 through 4, the plurality of portable communications assemblies 32 are more specifically shown. In a preferred embodiment, the portable communications assembly 32 is a wearable device 44. More specifically, the wearable device is shown as a hardhat 44, and while this example will be used for the remainder of the description, one skilled in the art should appreciate that the wearable device may be another article of protective clothing or merely clothing and still be within the scope of the invention.

The hardhat 44 includes additional hardware that allows the portable communications assembly 32 to communicate with the central processing unit 12, its peer portable communications assemblies 32, remote base stations 28, or the central base stations 24. The hardhat 44 includes a hard outer shell 46 with a hard bill 48 to which a visor 50 may be attached. The visor 50 is transparent to allow the individual wearing the hardhat 44 to see therethrough. An adjustment belt 52 is adjustable using a tensioning device 53 that allows the hardhat 44 to be worn comfortably but securably by the individual assigned to that hardhat.

A control unit 54 is affixed to the wearable device 44. A biometric sensor 56 is electrically connected to the control unit 54. The biometric sensor 56 is also affixed to the wearable device 44 in a manner such that the biometric sensor senses a condition of the individual wearing the wearable device 44. The biometric sensor 56 senses the condition and creates a biometric signal that is transmitted to the control unit 54. The portable communications assembly 32 also includes an environmental sensor 58 that is electrically connected to the control unit 54. The environmental sensor 58 is also affixed to the wearable device 44 in a manner such that the environmental sensor 58 senses an environmental condition local to the individual. The environmental sensor 58 may be spaced apart from the individual. The environmental sensor 58 creates an environmental signal and transmits that environmental signal to the control unit 54. A communications unit 60 is electrically connected to the control unit 54 and transmits the biometric and environmental signals from the control unit 54 to a location remote of the wearable device 44. As is shown in the example in FIG. 1, the communications unit 60 will transmit the biometric and environmental signals away from the portable communications assembly 32 to either another portable communications assembly 32, a base station 28a, 28b, and/or a central base station 24a, 24b, 24c of the communications hub 24. By the wearable device 44 having a communications unit 60 therein, the portable communications assembly 32 may communicate with other portable communications assemblies 32, or a central processing unit 12 of a communications assembly 10.

The portable communications assembly 32 includes a power supply 62 that provides power to all of the elements of the portable communications assembly 32 that require power. The power supply 62 may be removable such that power supplies may be interchanged allowing the individual wearing the portable communications assembly 32 to continue performing his or her functions by merely swapping out the power supply 62 with another one.

The portable communications assembly also includes the user interface 64 to provide information to the individual wearing the portable communications assembly 32. The user interface 64 may be a radio or some other form of audio communication. In addition, the user interface may include a haptic device or vibrator 66 and/or a visual communication device 68 fixedly secured to the bill 48 or visor 50 of the hardhat 44.

The visual communication device 68 may be a set of LEDs that provide different colored lights to indicate if there are certain occurrences or other events that require the individual wearing the wearable device to know the status. In one example, a green light may indicate that all of the systems are operating and there is no issue with any of the readings being taken. A yellow light may warn the individual that something may be occurring that will require the individual's attention. And finally, a red light may indicate that the individual has to take prompt action to avoid or avert a situation that may be potentially dangerous. For example, a red light may indicate to the individual that a carbon monoxide sensor has identified high levels of carbon monoxide in a particular area and that the individual must leave that area as soon as possible.

Additionally, the visual communication device 68 may include a heads up display that could display data in a manner that it appears to be on the visor 50 of the helmet 44. The data could be the light codes discussed above, alphanumeric messages, visual images, or any combination thereof.

The portable communications assembly 32 also includes a linking port 70 allowing the portable communications assembly 32 to be electrically connected to another portion of the communications assembly 10 allowing it to electrically download any information that is stored locally on the portable communications assembly 32. The linking port 70 would be electrically connected to a storage device 72 that would store the data collected by the biometric 56 and environmental 58 sensors. (Examples of a biometric sensor 56 include a heart rate sensor 56a, a body temperature, an oxygen level sensor, a blood pressure sensor, and the like. Examples of an environmental sensor 58 include a carbon monoxide sensor 58a, an ambient temperature sensor, a radiation sensor, a pressure sensor, a noxious fumes sensor, an accelerometer, and the like. These lists are intended to be exemplary and are not to be considered in any way limiting.)

The wearable device may also include a camera 74 that may take images or video as seen by the individual wearing the portable communications assembly 32 which could be stored in the storage device 72 or communicated back to the central processing unit 12 of the communications assembly 10 via radio communication 64 or the communications unit 60.

Referring specifically to FIG. 4, a schematic representation of the portable communications assembly 32 is generally indicated. The user interface 64 includes such elements as a visual display 68, an audio output 80, the haptic actuator (a vibration actuator) 66 and an emergency light 84. As discussed above, the visual display 68 may be shown upon the visor 50 of the hardhat 44. The audio output 80 may be a speaker for voice transmission or for an alarm. The emergency light 84 may be a strobe light. The user interface 64 includes switches, potentiometers and alarm switches 86 and a video camera/microphone combination 88 (only a video camera 74 is shown in FIG. 3). These devices 86, 88 provide information to the central processing unit 12 of the communication assembly 10. A bidirectional audio interface allows communication between the individual wearing the wearable device 44 and those that may be stationed at the central processing unit 12. In addition to the biometric 56 and environmental 58 sensors, a location and contact sensor 92 may provide inputs into the control unit of the wearable device 44 that provide where the wearable device 44 is. Other such sensors may identify how fast it is going, its location and orientation through uses of accelerometers and gyroscopes, RFID sensors and GPS. Input and output controllers 94 control the flow of communication.

The storage device 72 in the portable communications assembly 32 may include onboard firmware 95, onboard flash storage 96 and redundant flash storage 98. Communication controllers 100 control the communication between all of the different systems that are going to be used to control the communication between the wearable device 44 and the surrounding communication assembly 10. The portable communications assemblies 32 may include several different types of transceivers to facilitate as much communication as possible. By way of example, a transceiver may include a WiFi transceiver 102, a GSM transceiver 104, a Bluetooth® transceiver 106, an RFID transceiver 108, a ZigBee® transceiver 109 and/or a satellite transceiver. It should be appreciated by those skilled in the art that other types of transceivers may be used without avoiding the scope of the inventive concepts disclosed herein. A system bus 110 provides communication between all of these units.

The power supply 62 is more specifically shown to include power management circuits 112, a primary detachable and rechargeable battery 114 and a redundant detachable and rechargeable battery 116.

Figure 5B:
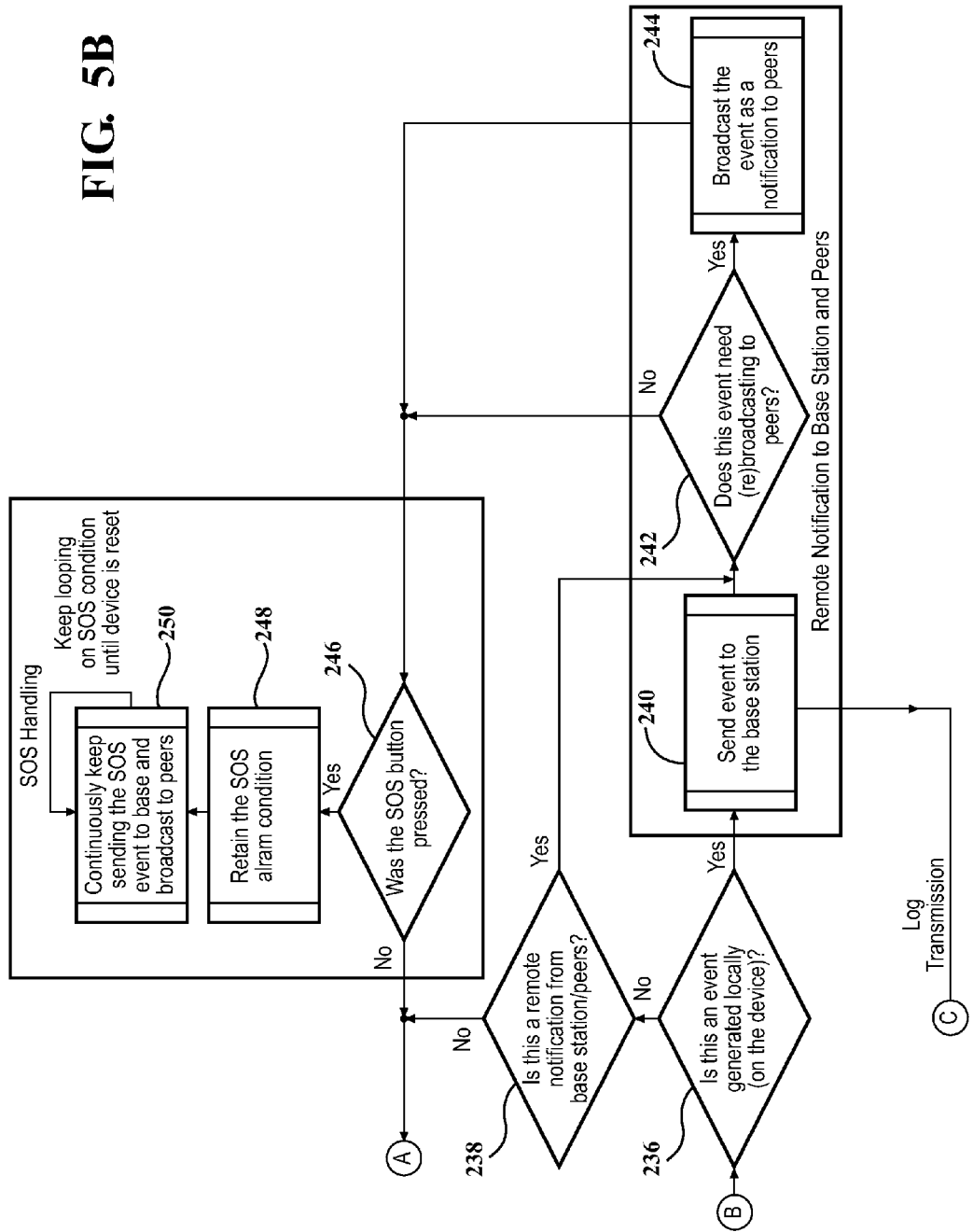

Referring to FIGS. 5A through 5C, wherein circled letters connect flow chart lines between FIGS. 5A and 5B, a method for communicating between a central processing unit 12 and a plurality of portable communications assemblies 32 is generally indicated at 200. The method begins at 202 with the powering on the portable communications assembly 32. Initialization in the starting of the method then begins at 204. Sensors in the system are initialized at 206. A stored onboard configuration 208 is input into the system when it is loaded and the notification settings are set at 210. A power test is run at 212. It is then determined whether the power on test was successful at 214. If not a notification is indicated at 216 and the portable communications assembly 32 is stopped at 220. This is done for each of the plurality of portable communications assemblies 32. Communications are then transmitted from each of the plurality of portable communications assemblies 32 to the central processing unit 12. This is done at step 222. The sensors are those that are the environmental 58, biometric 56 and contextual 92 sensors. The device status is also transmitted. Notification from the central processing unit 12 is also transmitted. Notifications from other remote portable communications assemblies 32 are presented and if any user manually presses an SOS button, it is also presented. The data is received by the central processing unit 12 at 224. An event queue 226 identifies and labels each received communication, sensors are read at 228, and all of the data is normalized and prioritized based on the particular configuration at 230. The prioritization of the data follows the table shown in FIG. 5C.

If it is determined that a notification is to be presented locally to an individual portable communications assembly 32, it is done so at 232. The notification may be audio, visual or haptic at 234. The memory device 72 stores the notification and logs it in its database. A local notification 232 will occur when it is identified that a portion of the plurality of the portable communications assemblies 32 send communications indicating a conditional threshold has been met.

It is then determined at 236 whether the event was generated locally. If not it is determined whether the remote notification is from the base station or its peers at 238. If the event was generated locally at 236, the event is sent to the base station at 240 where it is also logged on the onboard storage 72. If the event generated was done so remotely, it is then determined whether the event needs to be rebroadcast to a larger portion of the plurality of portable communications assemblies 32 regarding the threshold limit status at 242. If so, the broadcast of the event as notification to peers in a larger portion of the plurality of portable communications assemblies 32 is done at 244. If the event was determined not to be needed to be rebroadcast to its peers (242) it is determined whether an SOS button was pressed at 246. If not, the portable communications assembly 32 returns to the data acquisition subroutine of the method at 224. If the SOS button was pressed at 246, a SOS alarm condition is sent at 248. The SOS alarm is continued to be sent until the device is reset at 250. This method 200 continues until the device is turned off.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A hardhat assembly to be worn by an individual to a remote location, said hardhat assembly comprising:
    a hardhat having a hard outer shell and a hard bill;
    a control unit fixedly secured to said hard outer shell;
    a biometric sensor electrically connected to said control unit, said biometric sensor sensing a condition of the individual and creating a biometric signal and transmitting the biometric signal to said control unit;
    an environmental sensor electrically connected to said control unit, said environmental sensor senses an environmental condition local to the individual and creates an environmental signal and transmits the environmental signal to said control unit;
    a contextual sensing module electrically connected to said control unit to sense location, orientation, speed and acceleration of said hardhat assembly and creates contextual signals, and transmits the contextual signals to said control unit;
    an SOS button electrically connected to said control unit for generating an alarm condition signal, said SOS button activation overriding processing priority of all other functions of said control unit; and
    a communications unit electrically connected to said control unit for receiving the alarm condition, contextual, biometric and environmental signals from said control unit and to transmit the alarm condition, contextual, biometric and environmental signals away from the remote location to other of said hardhat assemblies local to the remote location and to a central processing unit located apart from the remote location to facilitate a rapid response to the alarm condition, contextual, biometric and/or environmental signals emanating from said hardhat assembly.

2. A hardhat assembly as set forth in claim 1 wherein said control unit, said biometric sensor, said environmental sensor and said communications unit are all secured to said hardhat assembly.

3. A hardhat assembly as set forth in claim 2 wherein the biometric sensor includes a heart rate sensor.

4. A hardhat assembly as set forth in claim 2 wherein said environmental sensor includes a carbon monoxide sensor.

5. A hardhat assembly as set forth in claim 1 including a power supply to provide power to said portable communications assembly.

6. A hardhat assembly as set forth in claim 1 including a linking port electrically connected to said control unit providing a temporary electrical connection of said control unit directly to external data collection devices.

7. A hardhat assembly as set forth in claim 1 including a user interface to provide information to and from the individual.

8. A hardhat assembly as set forth in claim 7 wherein said user interface includes audio prompts emitted toward the individual wearing said portable communications assembly.

9. A hardhat assembly as set forth in claim 8 wherein said user interface includes optical prompts emitted in a direction visible to the individual wearing said portable communications assembly.

10. A hardhat assembly as set forth in claim 9 wherein said user interface includes haptic prompts.

11. A hardhat assembly as set forth in claim 1 including a location sensing device electrically connected to said control unit to identify the location of said portable communications assembly.

12. A hardhat assembly as set forth in claim 1 including a memory device for storing data for a period of time until the data collected can be transmitted or downloaded to the external data collection devices.

13. A hardhat assembly as set forth in claim 1 wherein said contextual sensing module senses when the hardhat assembly abruptly drops in altitude such that a portion of said contextual signal identifies the abrupt drop in altitude.

* * * * *